June 7, 1960  W. J. BROWN  2,940,055
PHASE MODULATOR AND CLIPPER
Filed June 22, 1956  7 Sheets-Sheet 1

*INVENTOR.*
WALTER J BROWN
BY
*James B. Grant*

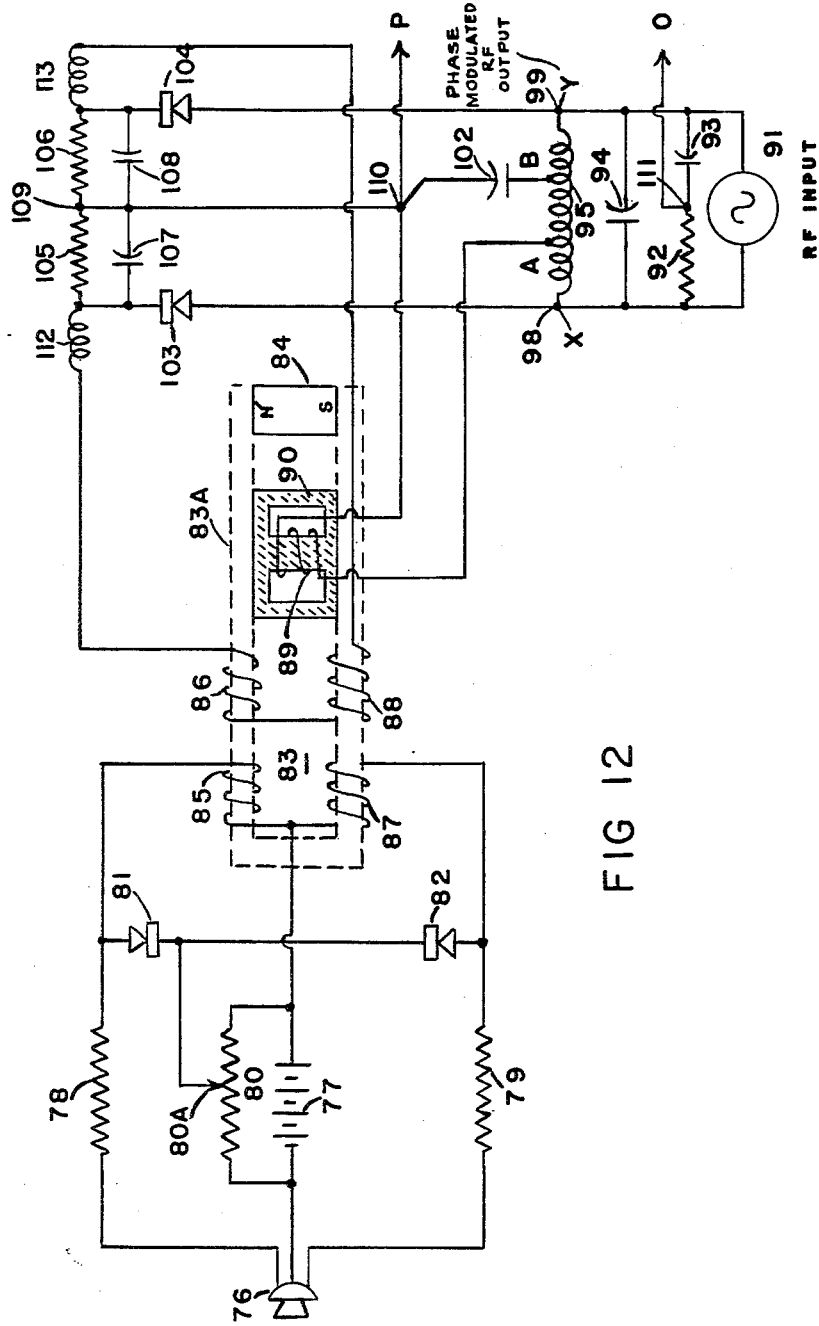

United States Patent Office 2,940,055
Patented June 7, 1960

2,940,055

PHASE MODULATOR AND CLIPPER

Walter J. Brown, 71 Gurley Road, Stamford, Conn.

Filed June 22, 1956, Ser. No. 593,183

12 Claims. (Cl. 332—29)

This invention pertains in general to phase modulators and more particularly to a phase modulating system having a characteristic such that a given audio-frequency modulating current produces the same phase deviation, regardless of the modulation frequency. Reference may be had to the phase shifting circuits of my U.S. Patents Numbers 2,524,759, 2,524,760, 2,524,761, 2,524,762. This invention may be used in some of the circuits described in my co-pending application Serial Number 575,133, dated March 30, 1956, entitled "Stabilized Phase Modulator."

An object of my invention is to provide a phase modulator in which the audio source supplies the same current at all frequencies to the phase shifting network.

Another object of my invention is to provide a phase modulator useable in combination with a fixed carrier frequency source to produce a constant phase deviation with constant modulating current, regardless of the modulation frequency.

Another object of my invention is to provide a phase modulator which produces a frequency deviation directly proportional to the modulation frequency when supplied with a constant modulating current.

Another object of my invention is to provide a phase modulator incorporating a clipper circuit without vacuum tubes to limit the maximum frequency deviation.

Another object of my invention is to provide a phase modulator minimizing the effect of variations in the D.C. modulation supply voltage.

Another object of my invention is to provide a wide angle phase modulator having a minimum of distortion.

Another object of my invention is to provide a phase modulator requiring no microphone transformer in the audio circuit, no pre-amplifier tubes, no phase modulator tubes and, when the circuit is used in a frequency modulation system, no first multiplier tube.

Other objects and a fuller understanding of my invention may be had by referring to the following description and claims taken in conjunction with the accompanying drawings, in which:

Figure 12 is a drawing showing a complete phase modulator in accordance with my invention.

Figure 1:
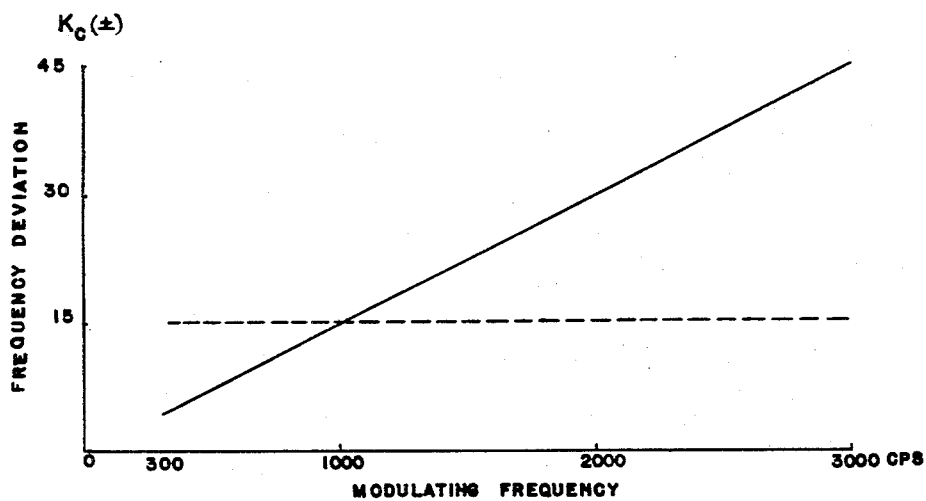
Figure 1 is a graph showing the radio frequency deviation required at various audio modulating frequencies in a frequency-modulated mobile radio transmitter.
Figure 2:
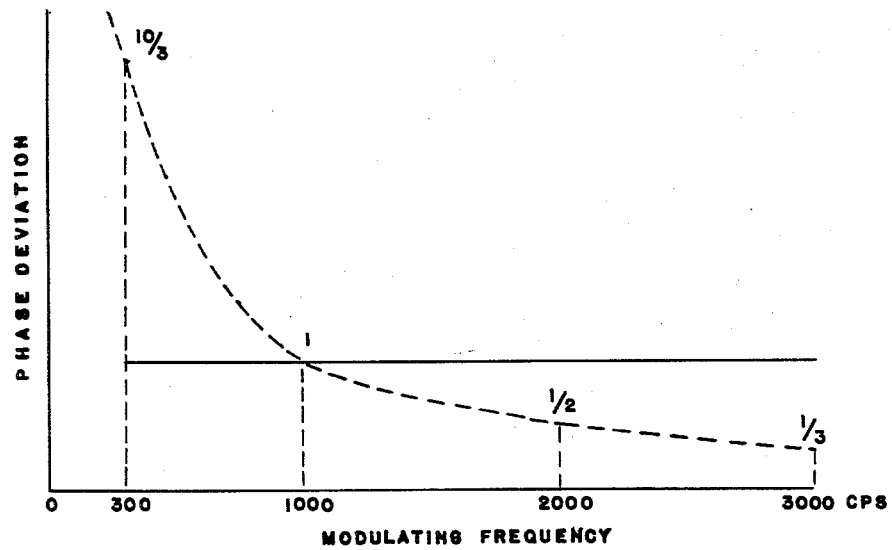
Figure 2 is another graph showing the corresponding phase deviation characteristics which are required in circuits employing a phase modulator to produce frequency modulation.

The circuits described in this invention are useable in a phase modulator system employing a carrier source of fixed phase and frequency, such as a crystal controlled oscillator, in combination with a phase shifting network which includes a saturable reactor having a radio frequency winding connected in the phase shifting network and an audio frequency control winding connected to an audio source of modulation. The audio source of modulation may be of the types shown in Figures 3, 5, 6, 7, 8, 9, 10, 11 and 12. The audio frequency component of the microphone current passes thru the audio winding of the saturable reactor and this produces a cyclical change in impedance of the RF winding and consequently a phase deviation at the output of the phase modulator which is proportional to the deviation of the audio control current from its normal value, regardless of the audio modulating frequency. If the microphone supplies constant current at all frequencies to the audio frequency control winding of the saturable reactor the maximum phase deviation will be constant at all modulation frequencies and the maximum frequency deviation will increase in direct proportion to the modulating frequency as shown in Figures 1 and 2. Figure 1 shows the basic frequency characteristic which is required under present regulations of the Federal Communication Commission for an FM mobile communication system.

The frequency deviation of the RF output of the transmitter, for a given audio modulating amplitude, rises in direct proportion to the modulating frequency from 300 c.p.s. to 3000 c.p.s. as shown by the sloping solid line which shows the frequency characteristic for 100% modulation. However, it is also required that the maximum frequency deviation be limited to ±15 kc. as shown by the horizontal dotted line, in order to prevent interference with adjacent communication channels.

In an FM transmitter of the phase modulated type, an oscillator source of fixed phase and frequency, such as a crystal oscillator, is used and its output is then phase modulated and the frequency of the phase modulator is then multiplied sufficiently to give the required RF frequency deviation. The RF frequency deviation produced by a given phase deviation is known to be proportional to the modulating frequency. Accordingly, the phase deviation required to produce the frequency characteristic of Fig. 1 is as shown in Fig. 2. The phase deviation should be constant at all modulating frequencies, as shown by the horizontal solid line which corresponds to 100% modulation, but the maximum phase deviation must be limited in accordance with the sloping dotted line, in which the limiting phase deviation is inversely proportional to the modulating frequency.

In such phase modulated transmitters in the prior art it was necessary to employ a vacuum tube as the variable impedance element in the phase modulator network together with a pre-amplifier tube to augment the modulating signal obtained from the microphone; it was also frequently necessary to include a predistorter or preemphasizing network in order that the high audio frequencies might be amplified to a greater extent than the low audio frequencies, so as to give the desired rising characteristic of frequency deviation shown in Fig. 1. According to the present invention, the needs for amplification of the audio modulating signal, and for amplifying the high audio frequencies to a greater extent than the low audio frequencies, are eliminated by using a saturable core reactor as the variable impedance element in the phase modulator network. The saturable reactor preferably comprises a radio-frequency magnetic core portion of ferrite, powdered iron or powdered iron oxide carrying a radio frequency winding which is connected in the RF network of the phase modulator, and an audio frequency magnetic core portion of laminated iron or iron alloy carrying an audio frequency winding which is connected in the audio network of the phase modulator. The magnetic core portions and the windings are so arranged that a modulating current in the audio frequency winding will vary the saturation and hence the permeability of the magnetic core portion within the RF winding, whilst the inductive coupling between the RF and audio frequency windings is minimized or neutralized by dividing either the RF or the audio frequency winding into two sections having relatively opposed magnetic couplings. A permanent magnet or D.C. winding may also be included for the purpose of magnetically biassing the RF core portion to its most favorable condition.

Figure 3:
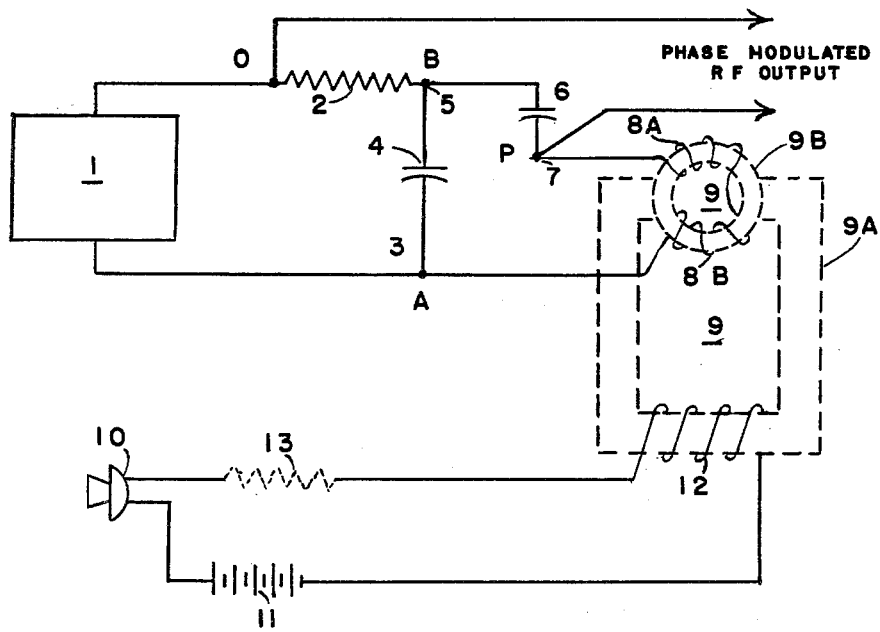
Figure 3 is a simplified drawing of a phase modulator circuit employing one of the corrective means of my invention.

Referring now to Figure 3, microphone 10 is connected thru resistor 13 and battery 11 to the control or audio winding 12 of a saturable reactor 9 which is magnetically coupled in opposite senses to the two RF winding portions 8A and 8B of the saturable reactor. The saturable reactor 9 has a laminated audio-frequency core portion 9A and a radio-frequency core portion 9B comprising a ring-shaped member of ferrite, powdered iron or powdered iron oxide. The RF winding portions 8A and 8B are serially connected and they are in turn connected in series with a condenser 6 thru an output terminal 7 across the terminals 3, 5 of a condenser 4. The condenser 4 is energized by a resistor 2 which is connected in series with it across the terminals 0, 3 of a constant frequency RF source 1, such as a crystal-controlled oscillator. The terminals 0, 3, comprise the input terminals of the RF phase-modulating network, and the terminals 0, 7, comprise its output terminals.

Figure 4:
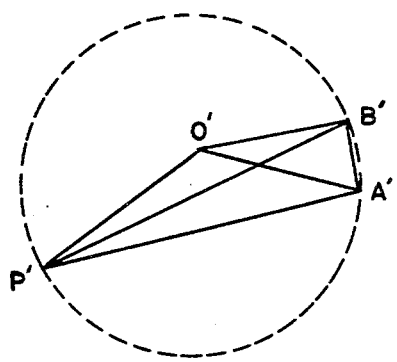
Figure 4 is a voltage vector diagram relating to the circuit of Figure 3.

Figure 4 is a vector diagram showing the relationships of base line voltage A'B'' taken across terminals 3 and 5 to the input voltage O'A' which represents the voltage across RF oscillator 1 which has constant phase and frequency. P'A' is the voltage across the inductive elements 8A and 8B between terminals 7 and 3, and P'B' is the voltage across the capacitive element 6 between the terminals 7 and 5. When the signal current thru the control winding 12 is increased, the inductance of the windings 8A and 8B is decreased due to core saturation, thus resulting in a reduction of the voltage P'A'' in relation to the voltage P'B'; if the saturable reactor is designed so that its Q or phase angle remains approximately constant while its inductance is varied by saturation, the angle A'P'B' will remain constant while the ratio of the amplitudes P'A' and P'B' is varied and accordingly the point P' will move around the arc of a circle spanning the baseline A'B' as shown in dotted lines. By suitable design the point O' may be located near to the center of said arcuate locus, and the output voltage O'P' may then be varied in phase while remaining substantially constant in amplitude.

Referring back to Figure 3, I have found that a constant current in the control winding of the saturable reactor can be produced (regardless of its frequency) by making the inductance of the control winding low in relation to the resistance of the microphone circuit. This result may be achieved by adding resistance 13, as shown in dotted lines, in series with the microphone circuit, or alternatively by winding the coil 12 with a small number of turns of wire. Other arrangements for ensuring that the saturable reactor control current is independent of the modulating frequency are shown in Figures 5 and 6 which show alternative audio frequency circuits to that shown in Figure 3.

Figure 5:
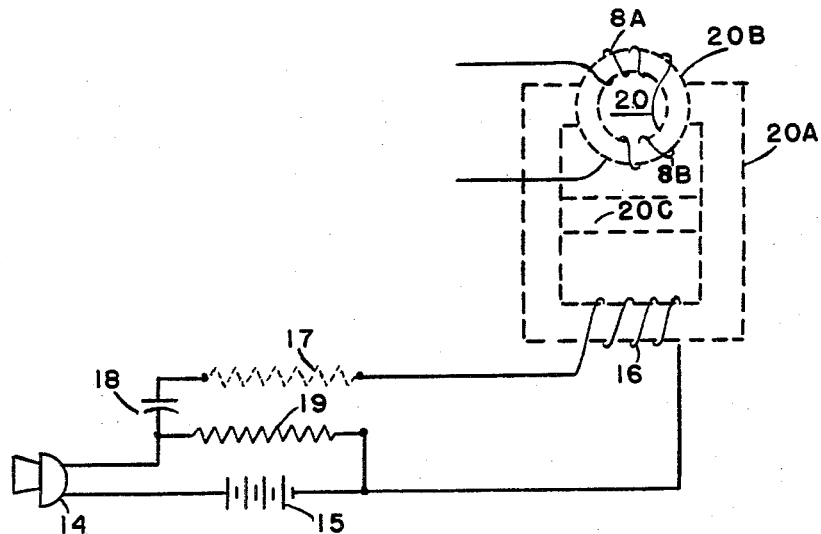
Figure 5 is another drawing of a phase modulator microphone circuit.

In Figure 5 the carbon microphone 14 and battery 15 are connected to the control winding 16 of a saturable reactor 20 through condenser 18 and preferably through resistor 17 which is shown in dotted lines. The D.C. component of the microphone current does not appear in the control winding 16 as it is by-passed thru resistor 19. The winding 16 has relatively few turns of wire, so that its reactance at audio frequency is low compared with the effective resistance of the microphone circuit. The saturable reactor 20 has an audio frequency core portion 20A and a radio frequency core portion 20B as shown in dotted lines. The permanent magnet 20C is used to bias the core of the saturable reactor magnetically, so that its saturating flux is increased or decreased according to whether the instantaneous microphone current is increased or decreased. The winding 8A, 8B is a radio frequency winding which is connected as the variable inductance in a phase shifting network such as is shown in Figure 3 or in one of the networks described in U.S. Patents 2,524,759, 2,524,760, 2,524,761 or 2,524,762.

Figure 6:
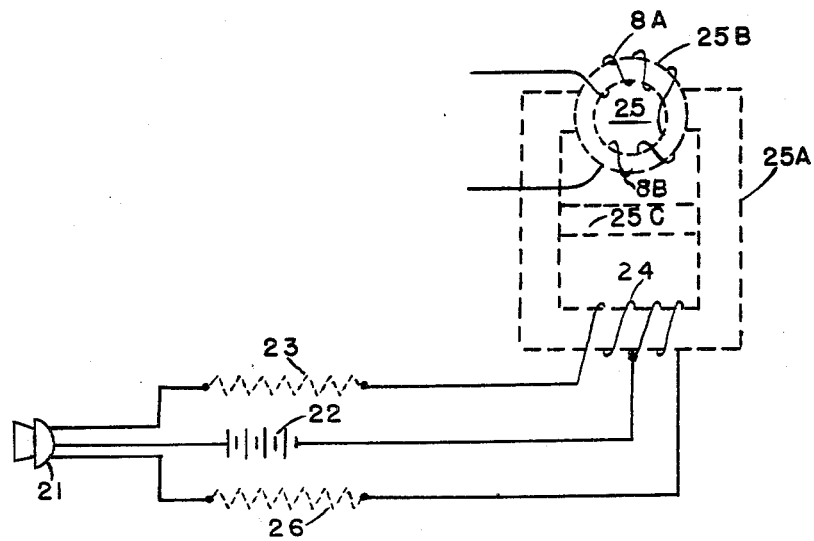
Figure 6 is a drawing of a similar circuit employing a double button microphone.

Figure 6 shows another arrangement employing a double button carbon microphone 21 connected to the control winding 24 of a saturable reactor 25, preferably through resistors 23 and 26. A D.C. source such as battery 22 is connected between the microphone and a center tap of the winding 24 to provide microphone current; the average D.C. currents in the two halves of the winding are balanced out in this arrangement, so that the battery current does not produce any appreciable unidirectional magnetomotive force in the core. The saturable reactor 25 has an audio frequency core portion 25A and an RF core portion 25B, and a biasing magnet 25C similar to the magnet of Figure 5 may be employed to provide the necessary steady unidirectional M.M.F. Again, the winding 24 is provided with relatively few turns so that its audio frequency reactance is small compared with the effective resistance of the microphone circuit. The radio frequency winding 8A, 8B is connected in a phase shifting network as previously described.

Figure 7:
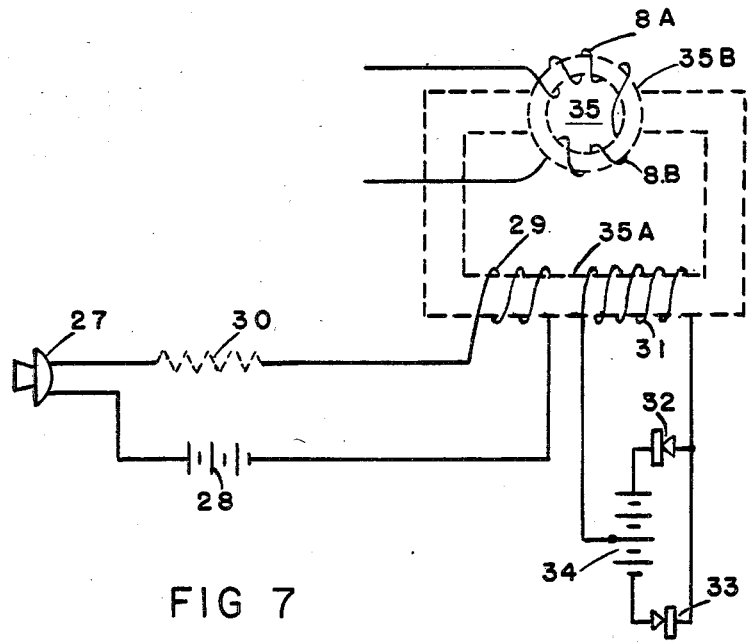
Figure 7 is a drawing of a clipper device for limiting frequency deviation in the phase modulator.
Figure 8:
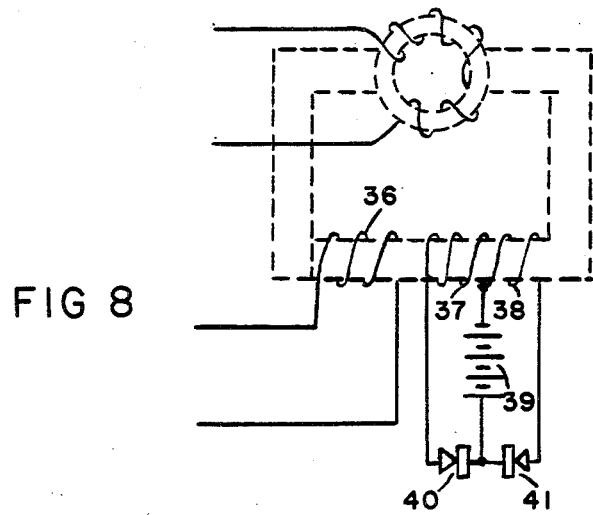
Figure 8 is a drawing showing another clipper arrangement.

It is necessary in many practical systems to provide a clipper arrangement for the purpose of limiting the frequency deviation and preventing interference with adjacent channels, in accordance with regulations of the Federal Communications Commission. The clipper must operate at a predetermined radio frequency deviation, and must therefore operate at a phase deviation which is inversely proportional to the audio modulating frequency, as shown by the dotted lines in Figures 1 and 2. This result may be accomplished as follows. Referring to Figure 7, microphone 27 is connected to control winding 29 thru resistor 30 and battery 28. Control winding 29 is a winding of a saturable reactor 35 having an audio frequency core portion 35A and a radio frequency core portion 35B. An additional high impedance winding 31 is provided on the same audio frequency portion of the saturable reactor core as the control winding 29 and is closely coupled thereto so that a voltage may be induced in the high impedance winding 31 which is proportional to the A.C. component of the audio control current multiplied by its frequency. Across the terminals of the high impedance winding 31 is connected an effective A.C. short circuit which comes into effect only when the voltage induced in the winding exceeds a predetermined value. Thus the clipper winding 31 has a center-tapped D.C. source such as battery 34 in combination with a pair of rectifiers 32 and 33 connected back to back with opposing D.C. reference voltages provided by each half of the D.C. source, so that the rectifiers only conduct when the voltage induced in winding 31 exceeds the voltage of one half of the D.C. source. The saturable reactor is again provided with an R.F. winding 8A, 8B which is connected in a phase-shifting network as previously described. A variation of this arrangement is shown in Figure 8 in which control winding 36 is coupled to a center-tapped clipper winding 37—38, the end terminals of which in turn are connected through back-to-back rectifiers 40 and 41 and battery 39 to the center tap of the clipper winding.

Figure 9:
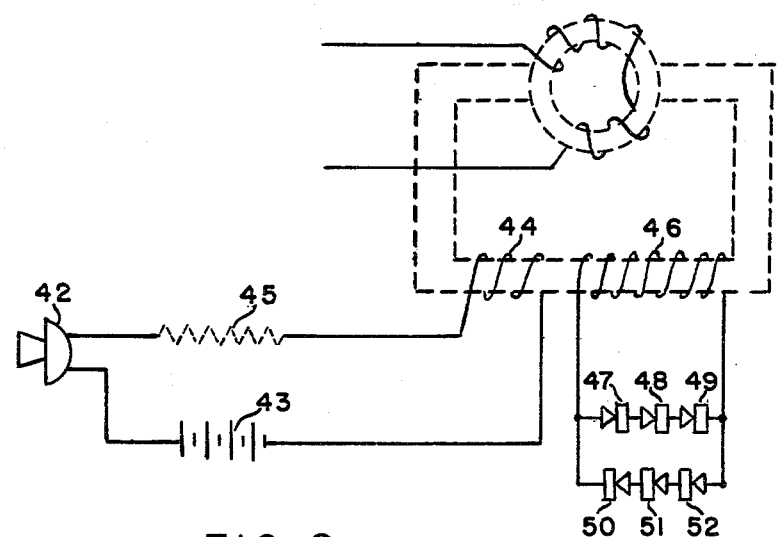
Figure 9 is a drawing showing still another arrangement.

Alternatively, the D.C. reference voltage may be omitted by using a rectifier such as a multiple plate selenium rectifier which does not conduct until an appreciable positive voltage has been reached. Such an arrangement is shown in Figure 9 in which microphone 42 is connected to control winding 44, resistor 45 and battery 43. Clipper winding 46 is connected to a pair of back-to-back series-connected rectifier groups consisting of rectifiers 47, 48, and 49 in one group and rectifiers 50, 51 and 52 in a second group.

Figure 10:
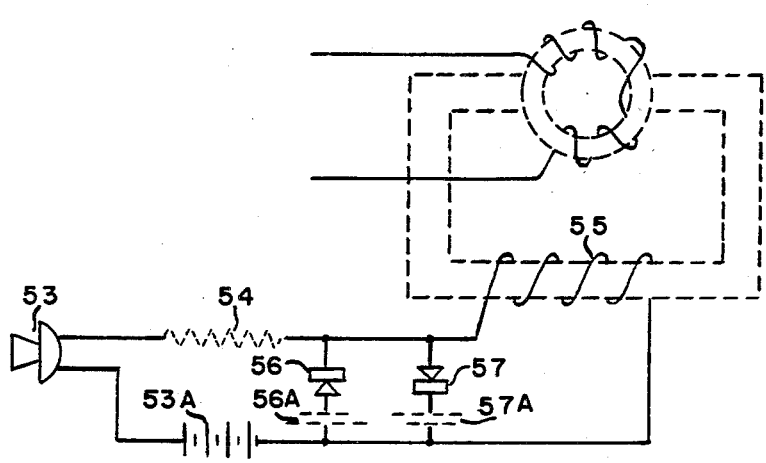
Figure 10 is a drawing showing a clipper circuit connected directly in the microphone circuit.

The clipping effect can be accomplished without use of a separate clipper winding by the arrangement shown in Figure 10 in which microphone 53 is connected thru battery 53A and resistor 54 to the control winding 55 of the saturable reactor. Rectifiers 56 and 57 are placed in opposite directions across the control winding 55. Bias or reference voltage may be included as indicated by the dotted lines 56A, 57A connecting each rectifier to one side of the control winding.

Preferably the total resistance of the microphone 53 and the resistor 54 is high compared with the reactance of the winding 55 over the required range of audio frequencies and, accordingly, the alternating component of the current thru the winding 55 is substantially independent of the modulation frequency. Also, the ohmic resistance of the winding 55 is preferably very low compared with the total resistance of microphone 53 and resistor 54, so that the D.C. voltage drop across winding 55 is negligible. However, the A.C. voltage drop across winding 55 is proportional to the A.C. component of the audio current multiplied by its frequency, and it is therefore proportional to the RF phase deviation multiplied by the audio modulation frequency, and is therefore proportional in turn to the frequency deviation in the RF output of the phase modulator. The rectifiers 56 and 57 are selected to have a low impedance, relative to the audio-frequency reactance of winding 55, when there is sufficient voltage across said winding to cause them to conduct and, accordingly, the rectifiers will clip off and bypass any components of the modulating current which would otherwise cause excessive radio frequency deviation. The bias or reference voltage sources 56A and 57A may take the form of a battery or other D.C. source with tappings thereon, or alternatively it may simply comprise the "threshold" voltage of the rectifiers 56 and 57, below which voltage they are substantially non-conducting. If the bias or reference voltages 56A and 57A are supplied from actual voltage sources, one of said voltages may be lower than the other, or may be entirely omitted, to compensate for the D.C. voltage drop which inevitably exists due to the microphone current in the winding 55.

Figure 11:
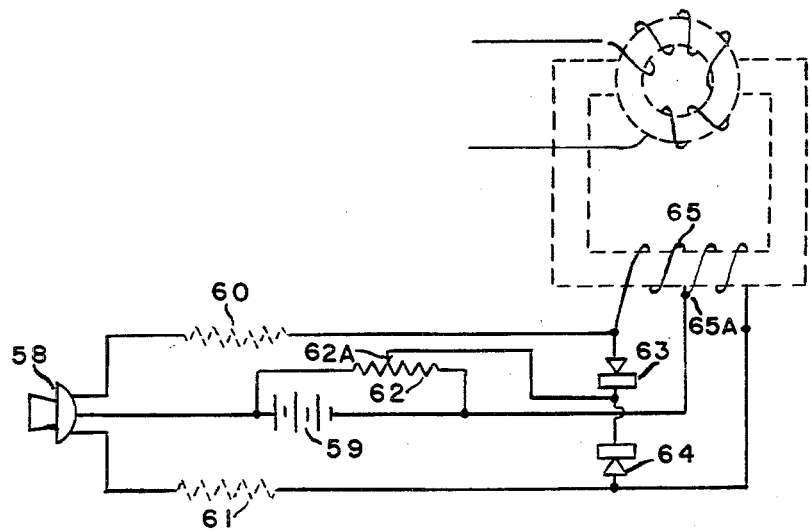
Figure 11 is a drawing showing an arrangement for limiting frequency deviation including a double button microphone.

Another arrangement is shown in Figure 11 using a double button carbon microphone 58 in which the microphone 58 is connected thru resistors 60 and 61 to opposite ends of the control winding 65. Battery 59 is connected between the microphone and a center tap 65A of the control winding 65. Rectifiers 63 and 64 are connected back to back across control winding 65 and are biased by battery voltage supplied by the potential divider 62. Potential divider 62 may be provided with a variable tap 62A to control the maximum radio frequency deviation by means of the clipper circuit.

Figure 12 shows a complete phase modulator. The microphone circuit is similar to the arrangement of Figure 11. Double button carbon microphone 76 is connected thru resistors 78 and 79 to the center tapped control windings 85 and 87 of saturable reactor 83. Rectifiers 81 and 82 are connected back to back and biased thru a tap 80A on potential divider 80 connected across battery 77 which may be any source of D.C. voltage. Rectifiers 81 and 82 provide a clipper effect limiting the maximum radio frequency deviation as discussed above. The audio frequency voltage across windings 85 and 87 is proportional to the modulation frequency so that rectifiers 81 and 82 conduct and limit the peak voltage to a value which is determined by the biasing or reference voltage from resistor 80 and which corresponds to a definite radio frequency deviation. The resistors 78 and 79 ensure that the audio frequency current in the control windings is substantially independent of the audio frequency. The saturable reactor 83 may have a laminated core structure 83A as shown in the dotted lines, carrying the control windings for the audio frequency path, and may have a pot core 90 of powdered iron or ferrite, carrying the winding 89 in the radio frequency path. The polarity is such that the audio frequency control windings 85 and 87 assist each other in driving an audio frequency flux from end to end of the pot core 90; on the other hand, the radio frequency current in winding 89 produces an RF flux which circulates between the central core and the outer shell of the "pot" without traversing the laminated section of the core. The permanent magnet 84 is arranged in shunt with the magnetic audio circuit including the pot core and is adjusted to provide the optimum magnetic biassing flux in the audio frequency magnetic circuit and the pot core. The double button carbon microphone 76 produces a roughly equal and opposite D.C. magnetization with respect to the laminated core structure of the saturable reactor thru windings 85 and 87. An RF carrier source voltage 91 is supplied to a resonant "tank" circuit comprising inductance 95 and condenser 94.

Figure 13:
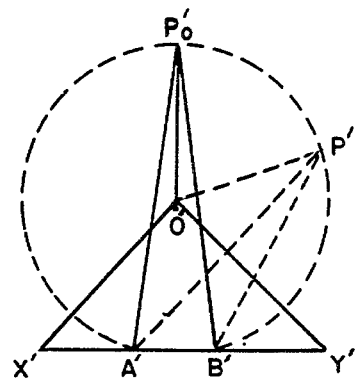
Figure 13 is a voltage vector diagram relating to the circuit of Figure 12.

The RF saturable reactor winding 89 is connected in series with condenser 102, thru the output terminal 110 (P) across the tappings A and B on the inductance 95 and the voltage across these elements may be represented by the vector triangle A'P'B' in Fig. 13, in which the point P' may be moved around its arcuate locus, shown as a dotted circle, by varying the inductance of the winding 89.

Resistor 92 and condenser 93 are connected in series, thru a second output terminal 111 (O), between points 98 (X) and 101 (Y), across the inductance 95, and their voltages may be represented by the vector triangle X'O'Y' in Fig. 13, in which O' is near the center of the arcuate locus of P'. Accordingly, an output voltage O'P' may be taken from the phase modulator which can be varied in phase over a wide angle while remaining substantially constant in amplitude.

In order to correct the position of point P' so that it assumes a symmetrical position close to $P_0'$ under quiescent conditions, rectifiers 103, 104 are provided in conjunction with condensers 107, 108 and resistors 105, 106, for the purpose of developing D.C. voltages across condensers 107, 108 which are generally proportional to the A.C. voltages X'P' and P'Y' in the vector diagram of Fig. 13. These D.C. voltages are applied to opposite ends of the saturable reactor "correcting" windings 86 and 88 with such polarity that any difference between said D.C. voltages alters the core saturation so as to move the point P' towards its symmetrical position $P_0'$. RF chokes 112 and 113 are provided to minimize high frequency losses, and furthermore the condensers 107, 108 and resistors 105, 106 and the windings 86, 88 are so chosen as to provide a relatively long time constant in comparison with the period of the lowest frequency signal which it is desired to transmit. Accordingly, the correcting circuits operate to prevent or minimize any slow drift of the output phase angle O'P' from its symmetrical or median position $O'P_0'$ but they do not operate quickly enough to prevent the rapid modulation of phase angle to either side of $O'P_0'$ at the desired audio or other signalling frequencies.

Although I have described my invention with a certain degree of particularity in its preferred form, it is understood that the present disclosure of the preferred form has been made only by way of example and that numerous changes in the details of construction and the combination and arrangement of parts may be resorted to without department from the spirit and scope of the invention as hereinafter claimed.

What is claimed is:

1. A phase modulator including: a saturable reactor having a magnetic core, a first winding and a center-tapped second winding on different portions of said core; a phase shifting network including said first winding; and a modulation circuit including a double button carbon microphone having two end terminals and a center-terminal, means for connecting said end terminals to opposite ends of said second winding, and means for connecting said center terminal and the center tap of said second winding to a direct current source, and in which the total resistance of said modulation circuit is high compared with the reactance of said second winding within a predetermined band of modulating frequencies.

2. A phase modulator including a saturable reactor having at least three windings and comprising: a phase-shifting network including said first winding and having input terminals for connection to a carrier source and output terminals for delivering a phase modulated output; means for connecting said second winding to a modulation source having a resistance which is high compared with the reactance of said second winding; means for limiting the maximum frequency deviation in the modulated output comprising a pair of rectifiers and means for connecting each of said rectifiers in series with a direct current source across at least a part of said second winding; and a stabilizing circuit for maintaining the mean phase angle of said output around a desired median value, said stabilizing circuit including a rectifier, the alternating current input to said circuit being coupled between an output terminal of the phase modulator and a point of fixed phase angle with reference to the carrier source, the output of said circuit being connected to said third winding.

3. The combination of claim 2 including means for adjusting the voltage of said direct current source, for the purpose of adjusting the maximum frequency deviation.

4. The combination of claim 2 including a permanent magnet for biasing a magnetic core of said saturable reactor.

5. A phase modulator for connection to an alternating current source having a constant carrier frequency, and for connection to a modulating source, and including a saturable reactor having a saturable magnetic core and a carrier frequency winding and a modulating winding, and also including first and second output terminals for delivering a phase-modulated output, comprising: first and second branch circuits adapted to be energized from said carrier frequency source, said first branch circuit including a resistance and a reactance serially connected with said first output terminal connected therebetween, said second branch circuit including said carrier frequency winding and a condenser serially connected with said second output terminal therebetween; and a modulation circuit including said modulating winding serially connected to a modulation source, said modulation circuit having a resistance which is high compared with the reactance of said modulating winding over a desired band of modulating frequencies; whereby the inductance of said carrier frequency winding is varied to produce a variation in phase angle of the voltage across said output terminals which variation is substantially independent of the modulating frequency.

6. The combination of claim 5 including a pair of rectifiers connected across said modulating winding, for limiting the maximum phase deviation to a value which is substantially conversely proportional to the modulating frequency.

7. The combination of claim 5 including a a permanent magnet for magnetically biasing said core.

8. The combination of claim 5 including a third winding on said saturable reactor, and a stabilizing circuit for maintaining the mean phase angle of said output around a desired median value, said stabilizing circuit including a rectifier; the alternating current input to said circuit being coupled between said second output terminal and a point of fixed phase angle with reference to said carrier source; the output of said stabilizing circuit being connected to said third winding.

9. A phase modulator comprising: a saturable reactor having a saturable magnetic core and a carrier frequency winding and a modulating winding; a condenser connected in a series resonant circuit with said carrier frequency winding with a first output terminal therebetween; means for energizing said series resonant circuit from a carrier frequency input source; and other circuit means for establishing a potential at a second output terminal; a modulation circuit including said modulating winding serially connected to a modulation source having a resistance which is high compared with the reactance of said modulating winding over a desired band of modulation frequences; whereby the phase angle of the voltage between said output terminals varies by an amount which is substantially proportional to the voltage of, but substantially independent of the frequency of said modulation source.

10. The combination of claim 9 including a pair of rectifiers connected across said modulating winding.

11. The combination of claim 9 including a permanent magnet for magnetically biasing said core.

12. The combination of claim 9 including a third winding on said saturable reactor, and a stabilizing circuit for maintaining the mean phase angle of said output around a desired median value, said stabilizing circuit including a rectifier; the alternating current input to said stabilizing circuit being coupled between said first output terminal and a point of fixed phase angle with reference to the carrier source; the output of said stabilizing circuit being connected to said third winding.

References Cited in the file of this patent

UNITED STATES PATENTS

| | | |
|---|---|---|
| 1,999,176 | Albersheim | Apr. 30, 1935 |
| 2,026,758 | Turner | Jan. 7, 1936 |
| 2,033,231 | Crosby | Mar. 10, 1936 |
| 2,491,590 | Sorensen | Dec. 20, 1949 |
| 2,569,309 | Hepp | Sept. 25, 1951 |
| 2,650,350 | Heath | Aug. 25, 1953 |
| 2,659,866 | Landon | Nov. 17, 1953 |